United States Patent
Ferone

[11] Patent Number: 5,641,461
[45] Date of Patent: Jun. 24, 1997

[54] OZONE GENERATING APPARATUS AND CELL THEREFOR

[76] Inventor: Daniel A. Ferone, 6038 Oakwood Ave., Cincinnati, Ohio 45224

[21] Appl. No.: 592,579

[22] Filed: Jan. 26, 1996

[51] Int. Cl.[6] .................................................. B01J 19/12
[52] U.S. Cl. ...................................... 422/186.07
[58] Field of Search ................ 422/186.07, 186.08, 422/186.09, 186.1, 186.11, 186.12, 186.13, 186.14, 186.15, 186.16

[56] References Cited

U.S. PATENT DOCUMENTS

| | | |
|---|---|---|
| 1,056,789 | 3/1913 | Held . |
| 2,345,798 | 4/1944 | Daily . |
| 3,309,304 | 3/1967 | Caplan . |
| 3,607,709 | 9/1971 | Rice . |
| 3,838,290 | 9/1974 | Crooks . |
| 3,903,426 | 9/1975 | Lowther ............... 422/186.07 |
| 3,967,131 | 6/1976 | Slipiec et al. . |
| 4,545,960 | 10/1985 | Erz et al. . |
| 4,606,892 | 8/1986 | Bachhofer et al. . |
| 4,666,679 | 5/1987 | Masuda et al. . |
| 4,818,498 | 4/1989 | Bachhofer et al. . |
| 4,892,713 | 1/1990 | Newman . |
| 4,960,570 | 10/1990 | Mechterscheimer . |
| 4,970,056 | 11/1990 | Wooten et al. . |
| 4,986,968 | 1/1991 | Hirth et al. ........... 422/186.19 |
| 5,009,858 | 4/1991 | Mechtersheimer . |
| 5,047,127 | 9/1991 | Tottori et al. ............... 204/176 |
| 5,087,418 | 2/1992 | Jacob . |
| 5,116,583 | 5/1992 | Batchelder et al. ....... 422/186.07 |
| 5,137,697 | 8/1992 | Lathan et al. . |
| 5,573,730 | 11/1996 | Gillum ..................... 422/123 |

*Primary Examiner*—Charles T. Jordan
*Assistant Examiner*—John R. Hardee
*Attorney, Agent, or Firm*—Wood, Herron & Evans, L.L.P.

[57] ABSTRACT

An ozone generating apparatus is disclosed having an ozone generator cell for producing ozone from oxygen containing air received through air inlets in the apparatus. The ozone generator cell includes a series of generally planar dielectric plates and electrodes arranged in spaced apart and noncontacting relationship for generating a high energy electric field between the electrodes. Hollow insulating tubes having a high dielectric strength are provided to support the dielectric plates along longitudinal edges thereof and further include axial slits in the tubes to support longitudinal edges of the planar electrodes. The dielectric plates and hollow insulating tubes define a series of air passages for passing the oxygen containing air across the electrodes to produce ozone. Ozone produced by the ozone generator cell is discharged through an ozone distributor mounted within the apparatus. A blower is provided to drive air in mixed combination with the ozone discharged from the ozone distributor whereby the mixed air and ozone combination is discharged from the apparatus through an ozone outlet.

12 Claims, 4 Drawing Sheets

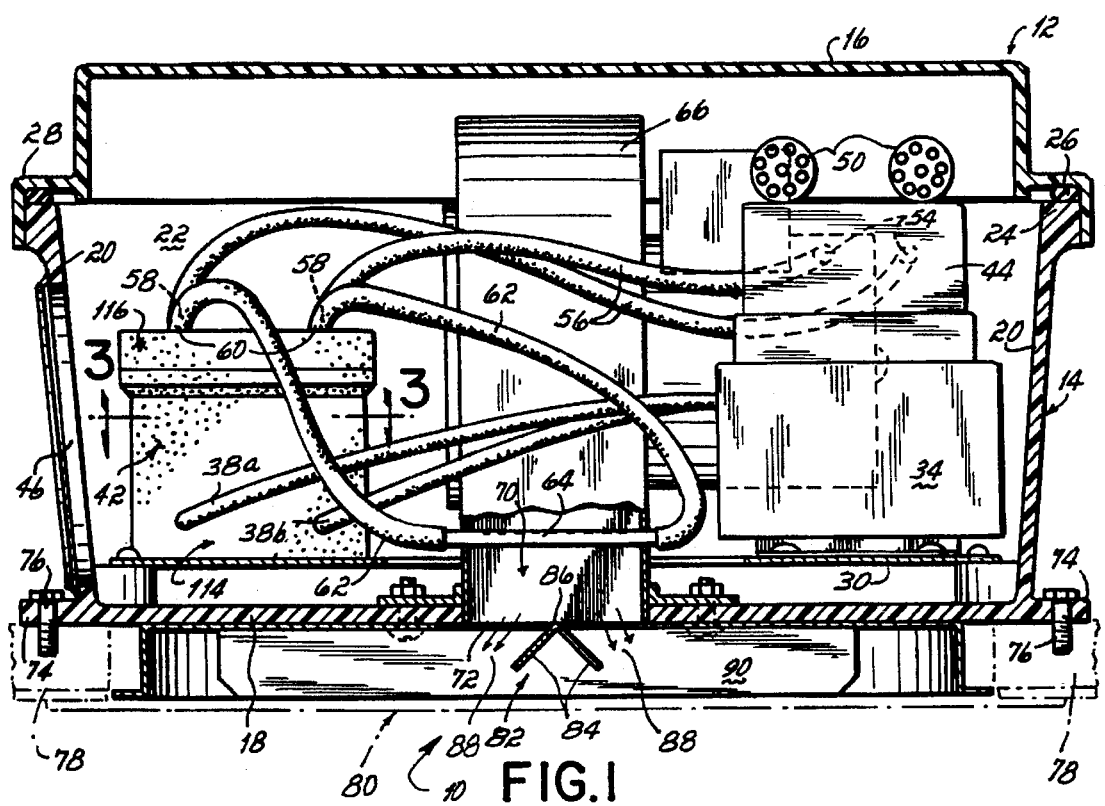
FIG.1
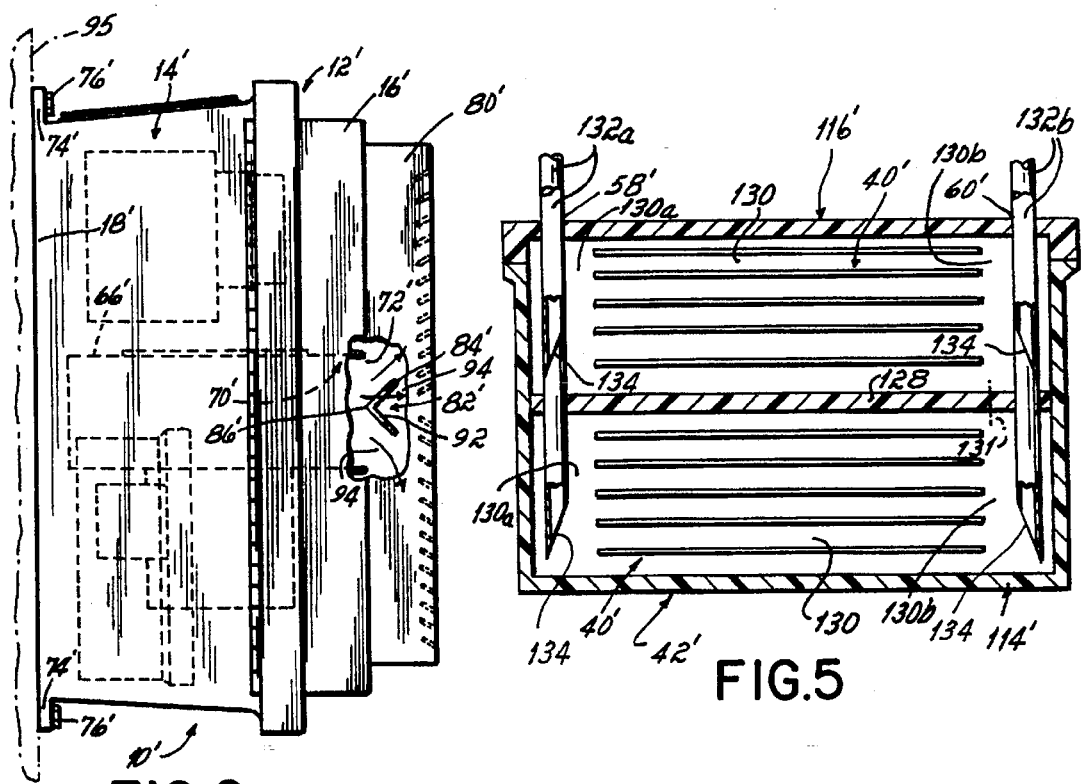
FIG.6
FIG.5

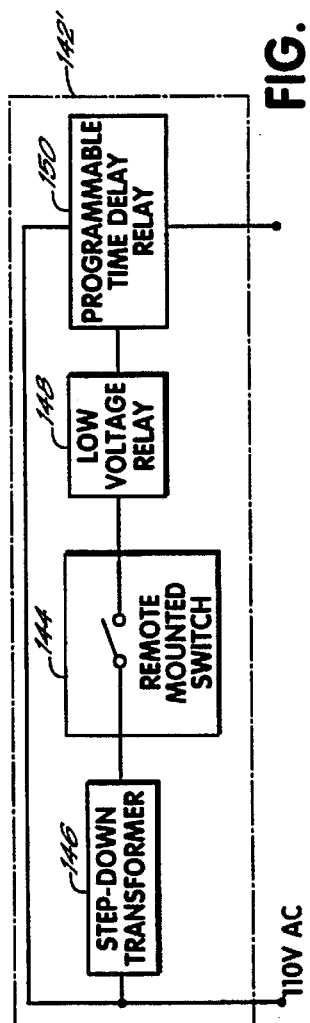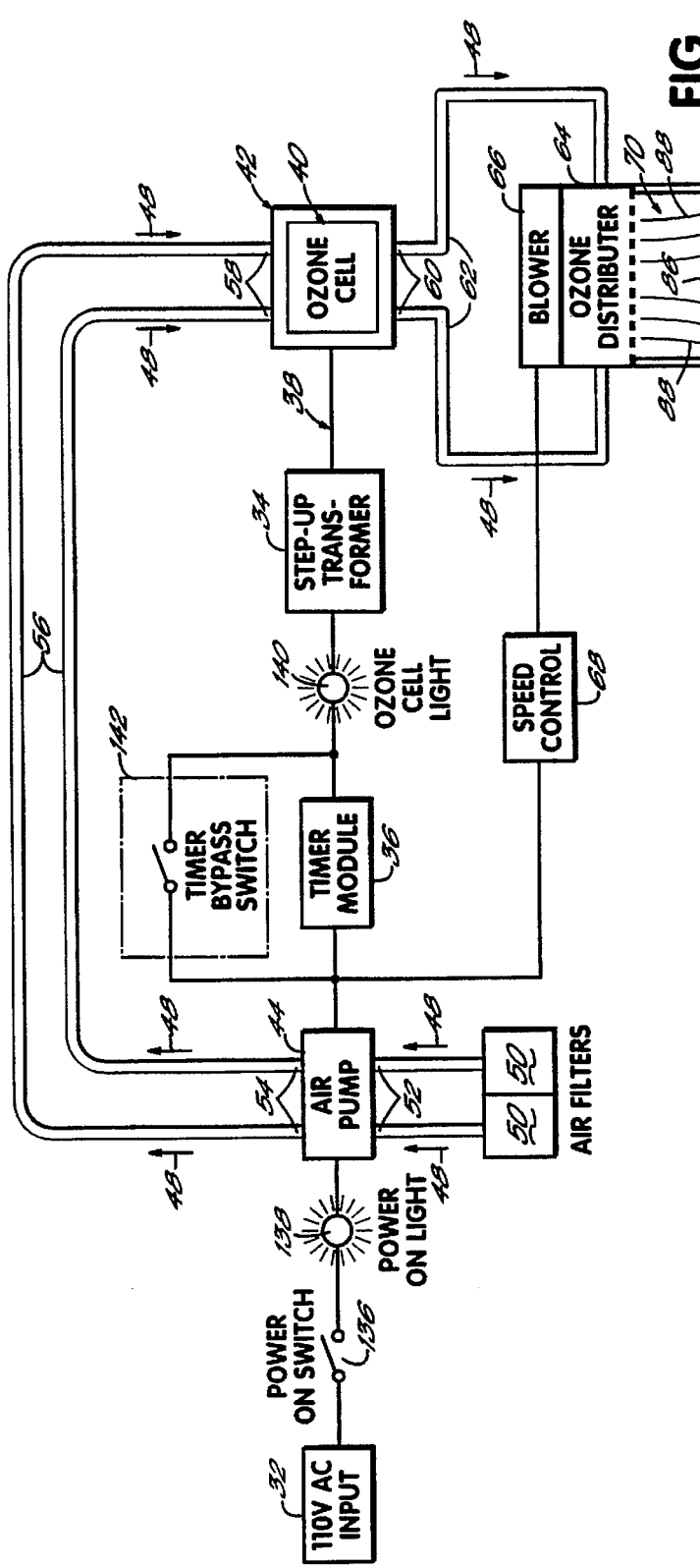

OZONE GENERATING APPARATUS AND CELL THEREFOR

FIELD OF THE INVENTION

The present invention relates generally to ozone generators and, more particularly, to ozone generator cells for producing ozone from oxygen containing air and apparatus for distributing ozone within an enclosure.

BACKGROUND OF THE INVENTION

Ozone is widely used throughout the world as a beneficial agent for destroying or eliminating bacteria and viruses, mold, fungi, and undesirable odors in household and commercial environments. To provide ozone in these and other environments, ozone generators have been developed to produce ozone from oxygen containing air passed through the ozone generator. Typically, ozone generators of the prior art include one or more pairs of planar electrodes arranged in spaced apart and noncontacting relationship with dielectric plates disposed between the electrodes. In operation, the electrodes are energized by a high voltage AC source, typically having an output voltage exceeding 5,000 volts applied to the electrodes, to generate a corona or high energy electric field between the electrodes while undesirable arcing between the electrodes is prevented by the dielectric plates. Ozone is produced by passing oxygen containing air across the energized electrodes through air passages formed between the dielectric plates.

One factor known to affect ozone production efficiency of a generator is the energized surface area of the planar electrodes. To maximize this surface area, wire mesh electrodes have been used in the past in ozone generator cells. However, due to the flexibility of wire mesh electrodes in comparison to known rigid metallic electrodes, a problem has existed in maintaining uniformity of spacing between adjacent pairs of the wire mesh electrodes. As wire mesh electrodes have a tendency to bend or flex, the distance between adjacent pairs of electrodes may become nonuniform, thereby causing an unequal distribution of the electric field between the electrodes or, in extreme cases, arcing between the electrodes. It will be appreciated that nonuniform electric field distribution results in inefficient ozone production while arcing between the electrodes may destroy the ozone generator cell altogether. For this reason, fine wire mesh electrodes have not been used in ozone generators of the prior art.

Moreover, arcing between electrodes outside of the peripheral edges of the dielectric plates is also a concern in ozone generator cell design. To reduce or eliminate this problem, ozone generator cells of the prior art have incorporated dielectric plates having length and width dimensions of greater extent than those of the electrodes. In some instances, the dielectric plates may have peripheral edges which extend one or more inches beyond the peripheral edges of the electrodes to eliminate arcing between the electrodes. Thus, ozone generator cells of the prior art have been required to sacrifice smaller size and lighter weight to accommodate for the extended dimensions of the dielectric plates.

SUMMARY OF THE INVENTION

Accordingly, a primary objective of the present invention is to provide an ozone generator cell which is compact and lightweight yet highly efficient in producing ozone from oxygen containing air passed through the cell.

Another objective of the present invention is to provide an ozone generator cell which is modular in construction to permit ozone output adjustment for a particular application.

Yet another objective of the present invention is to provide an ozone generator cell which substantially eliminates arcing between electrodes to increase the operating life of the ozone generator cell.

Still yet another objective of the present invention is to provide an ozone generator which is readily installed above a ceiling or on a wall structure for distributing ozone within an enclosure.

To these ends, an apparatus for generating ozone from oxygen containing air is disclosed. The apparatus includes a housing having an air inlet for receiving oxygen containing air and an ozone outlet for discharging ozone produced by an ozone generator cell mounted within the housing. The housing is adapted to be mounted above a ceiling or on a wall structure through fasteners and includes a diffuser vent for distributing the ozone discharged from the ozone outlet within an enclosure.

A pump is mounted within the housing and includes at least one air intake port for receiving the oxygen containing air and at least one air exhaust port for discharging the air to the ozone generator cell. The ozone generator cell is energized by a high voltage transformer mounted within the housing and is fluidly connected to the air exhaust ports of the pump for producing ozone from the oxygen containing air received from the pump. An ozone distributor is fluidly connected to the ozone generator cell for discharging ozone produced by the ozone generator cell. In a preferred embodiment, the ozone distributor comprises a perforated stainless steel tube which is resistant to ozone deterioration. A forced air device is mounted within the housing for driving air in mixed combination with the ozone discharged from the ozone distributor whereby the mixed air and ozone combination is discharged from the ozone generating apparatus as a stream.

The ozone generator cell of the present invention includes a series of planar dielectric plate members and electrodes arranged in spaced apart and noncontacting relationship. The high voltage transformer is connected to the electrodes to generate an electrical discharge or corona between adjacent pairs of the electrodes. In a preferred embodiment, the electrodes comprise fine wire mesh to provide an improved electrical discharge or corona between the electrodes for the production of ozone. Hollow insulating tubes having a high dielectric strength are provided between the dielectric plate members to support the dielectric plate members along their longitudinal edges. Each of the hollow insulating tubes includes an axial slit extending along at least a partial length of the tube for supporting a longitudinal edge of the electrodes. The dielectric plate members, in combination with the hollow insulating tubes, define a series of air passages for passing the oxygen containing air across the electrodes.

In a preferred embodiment, hollow insulating tube spacers are provided between the dielectric plate members to support the dielectric plate members at their opposite ends. Each of the hollow insulating tube spacers includes an axial slit extending along a partial length of the tube for supporting an edge of the electrodes. The ozone generator cell preferably includes a high dielectric strength sealant disposed between and along the longitudinal edges of the dielectric plate members and outboard of the hollow insulating tubes to substantially eliminate any arcing between the electrodes around the peripheral edges of the dielectric plate members.

The objectives and features of the present invention will come readily apparent when the following Detailed Description is taken in conjunction with the accompanying drawings in which:

BRIEF DESCRIPTION OF THE DRAWINGS

FIG. 1 is a longitudinal cross-sectional view of an ozone generating apparatus in accordance with the present invention shown mounted to structural members above a ceiling;

FIG. 2 is schematic diagram of one embodiment of the ozone generating apparatus;

FIG. 2A is a schematic diagram of an alternative embodiment of one aspect of the ozone generating apparatus shown in FIG. 2;

FIG. 5 is a diagrammatic view of an alternative embodiment of an enclosure for a plurality of ozone generator cells; and FIG. 6 is a side view of an alternative embodiment of an ozone generating apparatus in accordance with the present invention shown mounted on a wall structure.

DETAILED DESCRIPTION OF THE INVENTION

Figure 3:
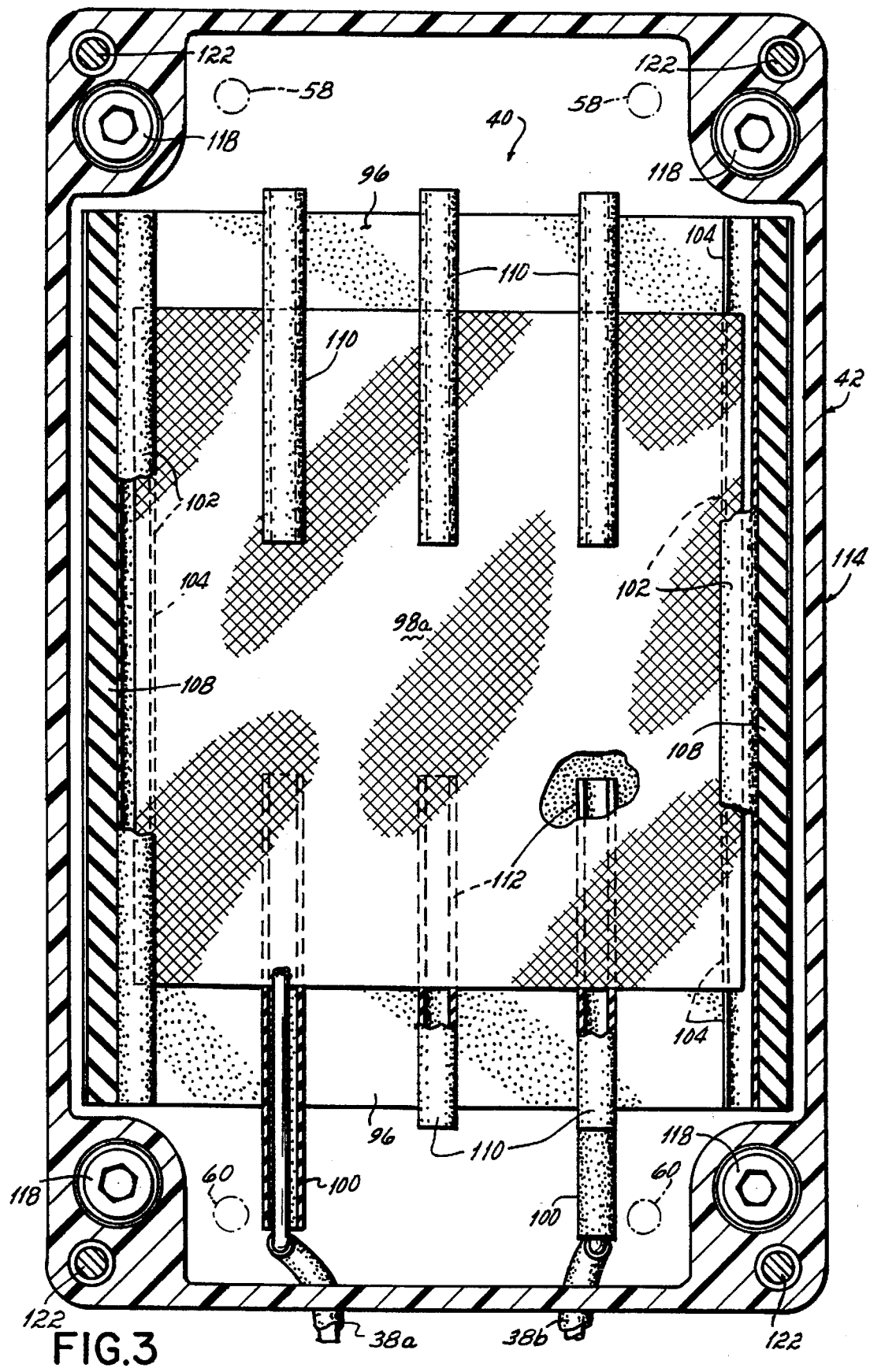
FIG. 3 is a cross-sectional view of an ozone generator cell and an enclosure for the ozone generator cell taken along lines 3—3 of FIG. 1.

With reference to the drawings, and to FIG. 1 in particular, an ozone generating apparatus 10 in accordance with the principles of the present invention is shown. Ozone generating apparatus 10 includes a generally rectangular housing 12 having a base 14 and a top 16 made of fiberglass or other suitable non-conductive and ozone resistant material. The base 14 includes a bottom 18 which is preferably integrally molded with a pair of end walls 20 and a pair of side walls 22 (one shown). The top 16 is hinged to the base 14 along one of the side walls 22 and is further sealingly engageable with an upper peripheral edge 24 of the base 14 through a gasket 26 disposed about a peripheral edge 28 of the top 16. A pair of latches (not shown) is provided to secure the top 16 in a closed position with the base 14 as shown in FIG. 1.

Referring to FIGS. 1 and 2, the ozone generating apparatus 10 includes a ground plate 30, preferably made of aluminum or similar lightweight and electrically conductive material, mounted on the bottom 18 of the base 14. The ground plate 30 is coupled to ground of a standard 110 VAC line 32 (see FIG. 2) which extends into the housing 12 and is coupled to a terminal block (not shown) mounted on the ground plate 30. As the term is used herein, and as shown in FIG. 2, "110 VAC line" refers to the ground, neutral and hot lines found in standard three conductor AC power cords. A high voltage step-up transformer 34 is mounted on the ground plate 30 and has its primary energized by the 110 VAC line 32 through a timer module 36 (see FIG. 2) as will be described in more detail below. The high voltage step-up transformer 34 has its secondary coupled through electrical leads 38a and 38b to an ozone generator cell 40 (see FIGS. 3 and 4) disposed within an enclosure 42 mounted to the ground plate 30. In a preferred embodiment, the step-up transformer 34 has an output voltage in a range between about 7,000 and 8,000 volts.

The ozone generating apparatus 10 further includes a diaphragm air pump 44 for receiving oxygen containing air from air inlets 46 formed in one of the end walls 20. The arrangement of the air inlets 46 is not considered to be a critical aspect of the present invention and thus may vary with a particular application. The air pump 44 is energized by the 110 VAC line 32 and receives oxygen containing air, shown diagrammatically by arrows 48 in FIG. 2, through a pair of air filters 50 connected to a pair of air intake ports 52 in the air pump (see FIG. 2). In a preferred embodiment, each of the air filters 50 includes a cotton pad prefilter assembled with a granular carbon filter.

The air pump 44 further includes a pair of air exhaust ports 54 for discharging the filtered oxygen containing air 48 through a pair of flexible conduits 56. The conduits 56, made of soft silicon tubing, for example, fluidly connect the air exhaust ports 54 of the air pump 44 to a pair of air intake ports 58 formed in the enclosure 42 (see FIG. 2) for delivering the oxygen containing air 48 to the ozone generator cell 40 within the enclosure. In one embodiment, the air pump 44 has an output volume of about 10 liters/min. to sufficiently cool the ozone generator cell 40 during its operation as will be described in more detail below.

The enclosure 42 further includes a pair of ozone exhaust ports 60 (see FIG. 2) for discharging ozone produced by the ozone generator cell 40 through a second pair of flexible conduits 62. The conduits 62, similar in material and construction to the conduits 56, fluidly connect the ozone exhaust ports 60 of the enclosure 42 to opposite ends of an ozone distributor 64 for discharging ozone produced by the ozone generator cell 40. Preferably, the ozone distributor 64 is made of a perforated stainless steel tube which is resistant to pitting or other deterioration by ozone produced by the ozone generator cell 40. In an alternative embodiment, the ozone distributor 64 is made of a perforated fluorinated polyethylene tubing (preferably Chemfluor) which is also resistant to ozone deterioration.

With further reference to FIGS. 1 and 2, a preferred embodiment of the ozone generator apparatus 10 includes a blower 66 mounted to the bottom 18 of the base 14. The blower 66 is energized by the 110 VAC line 32 through a variable speed control rheostat 68 (see FIG. 2) which provides air output adjustment for the blower. As shown most clearly in FIG. 1, the blower 66 preferably includes an air discharge channel 70 extending to an ozone outlet 72 formed in the bottom 18 of the base 14. The ozone distributor 64 is preferably mounted within and transverse to the air discharge channel 70. In this way, the blower 66 drives air in mixed combination with ozone discharged by the ozone distributor 64 and the mixed air and ozone combination is discharged from the ozone generating apparatus 10 as a stream through the ozone outlet 72.

Referring further to FIG. 1, the ozone generating apparatus 10 includes integral flanges 74 extending outwardly from the bottom 18 of the base 14. The flanges 74 are adapted to receive fasteners 76 for mounting the ozone generating apparatus 10 to structural members 78 disposed above a ceiling. In an alternative embodiment not shown, the ozone generating apparatus 10 includes one or more eye hooks mounted on the top 16 of the housing 12 or on any other suitable part of the housing for suspending the ozone generating apparatus by a chain or similar means from a roof structural member. In this way, the ozone generating apparatus 10 may form part of a drop or suspended ceiling where structural members 78 are not present. In one embodiment, the ozone generating apparatus 10 further includes a diffuser vent 80 mounted on the bottom 18 of the base 14 for cooperating with an opening in a ceiling to diffuse the mixed air and ozone combination discharged from the ozone outlet 72.

In an embodiment (not shown), the diffuser vent 80 comprises a fixed propeller blade mounted to the bottom 18 of the base 14 for imparting a rotation to the mixed air and ozone stream as it is discharged from the ozone outlet 72. In this way, the fixed propeller blade improves distribution and mixture of the air and ozone stream within an enclosure. Those skilled in the art will appreciate that the diffuser vent 80 may have one of many configurations.

In those applications requiring ventilation of an enclosure or room having a greater length than width, a baffle member 82 (see FIGS. 1 and 2) is mounted to the bottom 18 of the ozone generating apparatus 10 for purposes to be described in more detail below. The baffle member 82, such as a standard piece of angle iron, includes a pair of angularly disposed baffle plates 84 extending outwardly from a crown 86. The baffle member 82 is mounted transverse to the ozone outlet 72 with the crown 86 disposed proximate the ozone outlet. In this way, the blower 66 drives the mixed air and ozone combination against the angularly disposed baffle plates 84 to diffuse the air and ozone combination into a pair of divergent streams, shown diagrammatically as arrows 88 in FIGS. 1 and 2. As shown in FIG. 1, a pair of side baffle plates 90 (one shown) may be mounted transverse to the baffle member 82 to further define the divergent streams 88.

In an alternative embodiment shown most clearly in FIG. 6, a baffle member 82' is provided having a series of slots 92 formed in a pair of angularly disposed baffle plates 84' and extending across a crown 86' of the baffle plate member. In this way, a blower 66' drives the mixed air and ozone combination through the slots 92 and against the angularly disposed baffle plates 84' to diffuse the air and ozone combination into a series of divergent streams, shown diagrammatically as arrows 94 in FIG. 6.

With further reference to FIG. 6, an alternative embodiment of the ozone generating apparatus 10 is shown as 10'. Ozone generating apparatus 10' is similar in construction to and operates in substantially the same manner as the ozone generating apparatus 10 disclosed in detail above with reference to FIGS. 1 and 2. Ozone generating apparatus 10' includes a generally rectangular housing 12' having a base 14' and a hinged top 16'. In this embodiment, a bottom 18' of the base 14' includes integral flanges 74' extending outwardly from the bottom which are adapted to receive fasteners 76' for mounting the ozone generating apparatus 10' on a wall structure 95. The blower 66' is mounted to the top 16' of the housing 12' and preferably includes an air discharge channel 70' extending to an ozone outlet 72' formed in the top. The ozone generating apparatus 10' further includes the baffle member 82' and a diffuser vent 80' mounted on the top 16' of the housing 12' to diffuse the mixed air and ozone combination discharged from the ozone outlet 72' as described in detail above.

Figure 4:
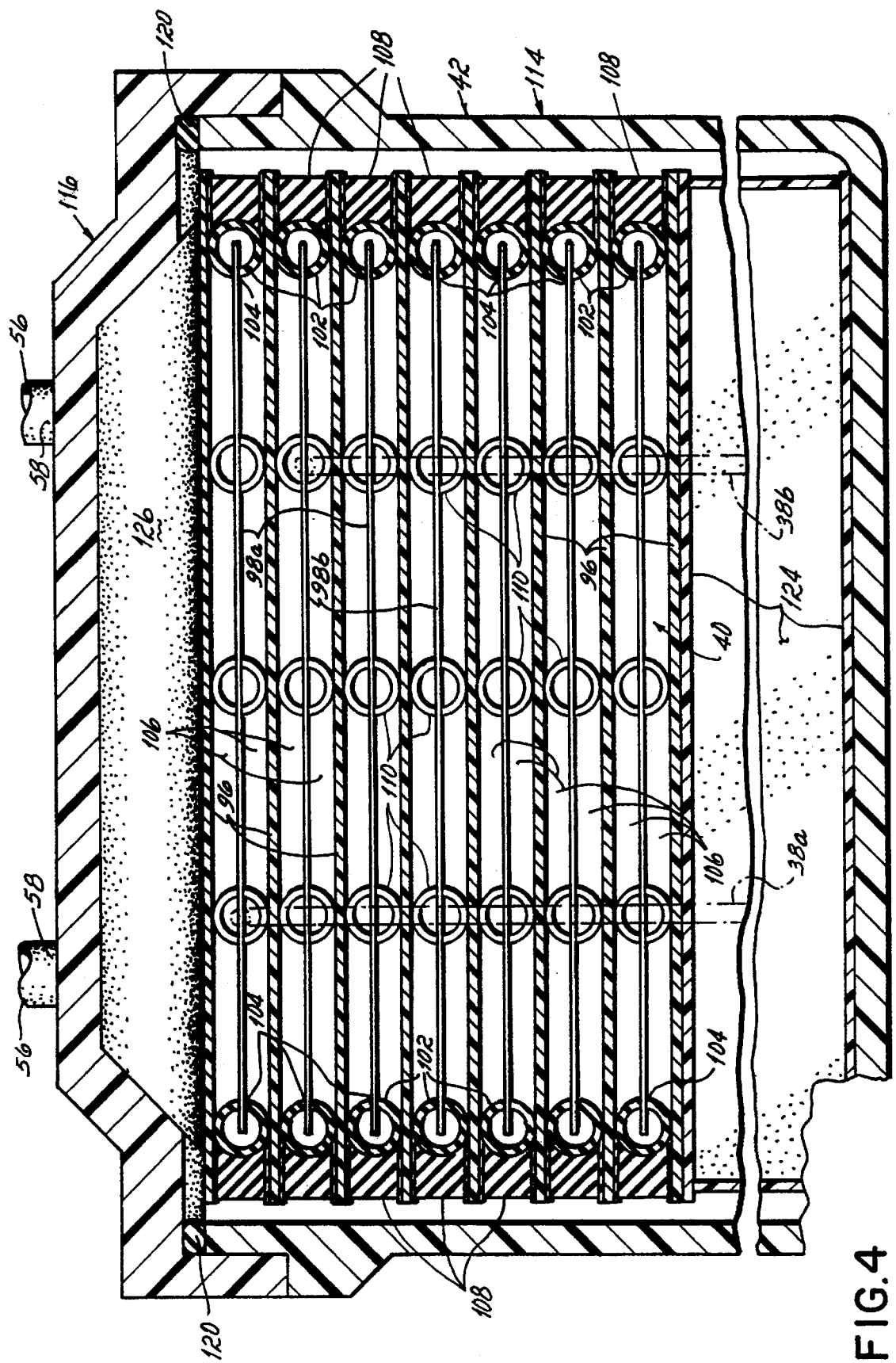
FIG. 4 is a cross-sectional view of the ozone generator cell and the enclosure.

Now referring to FIGS. 3 and 4, the ozone generating cell 40 and the enclosure 42 for the cell are shown in greater detail. The ozone generator cell 40 includes a series of generally planar and spaced apart dielectric plate members 96, preferably made of epoxy-coated mica, arranged in spaced apart and stacked relationship as will be described in more detail below. The ozone generator cell 40 further includes a series of generally planar electrodes 98a and 98b disposed between and in noncontacting relationship with the dielectric plate members 96. The electrodes 98a and 98b are energized by the electrical leads 38a and 38b, respectively, coupled to the secondary of the high-voltage step-up transformer 34 to produce a corona discharge or high energy electric field between the electrodes as will be appreciated by those skilled in the art. The electrical leads 38a and 38b are preferably 22 gauge stainless steel wire which are stripped at their respective ends and soldered or otherwise welded to the electrodes 98a and 98b, respectively, as shown in FIGS. 3 and 4. A fluorinated polyethylene tubing cover 100 (preferably Chemfluor) (see FIG. 3) is inserted over the stripped ends of the electrical leads 38a and 38b to eliminate arcing between the leads and between the leads and the electrodes 98a and 98b.

In accordance with the present invention, the dielectric plate members 96 are supported along their opposite longitudinal edges by hollow insulating tubes 102 disposed between the dielectric plate members. Each of the hollow insulating tubes 102 has an axial slit 104 extending along at least a partial length of the tube 102 for supporting a longitudinal edge of the planar electrodes 98a and 98b. In this way, the dielectric plate members 96 and the hollow insulating tubes 102 define a series of air passages 106 for passing the oxygen containing air 48 (see FIG. 2) across the electrodes 98a and 98b to produce ozone as described in more detail below. The hollow insulating tubes 102, by reason of their tubular construction, provide air passages 106 extending completely to the peripheral edges of the electrodes 98a and 98b, thereby allowing larger electrode surfaces and maximizing the usable energized surface area of the electrodes.

The ozone generator cell 40 further includes a high dielectric strength sealant 108, preferably Dow Corning's 832 or 739 moisture cured alcohol based sealant, disposed between and along the longitudinal edges of the dielectric plate members 96 and adjacently outboard of the hollow insulating tubes 102 to maintain the dielectric plate members in spaced apart and stacked relationship. The hollow insulating tubes 102 are preferably made of fluorinated polyethylene tubing (Chemfluor) and have a dielectric strength of at least 2,000 V/mil. The high dielectric strengths of the hollow insulating tubes 102 and the sealant 108 substantially eliminate any arcing between the electrodes 98a and 98b around the peripheral edges of the dielectric plate members 96.

In a preferred embodiment, the dielectric plate members 96 are about 3.0"×3.8" and have a thickness of about 0.040". The hollow insulating tubes 102 which support the dielectric plate members 96 and electrodes 98a and 98b in spaced apart and noncontacting relationship have an ID of about 1/16" and an OD of about 1/8". The planar electrodes 98a and 98b are preferably made of 316L stainless steel mesh and are at least as fine as 50×50 mesh. The electrodes 98a and 98b are preferably about 2.6"×2.9" and have a thickness of about 0.009". Those skilled in the art will appreciate that the 50×50 stainless steel mesh electrodes 98a and 98b of the preferred embodiment, in combination with the dielectric plate members 96 and the hollow insulating tubes 102, provide a compact yet highly efficient ozone generator cell heretofore unknown in the art.

In a preferred embodiment, a series of hollow insulating tube spacers 110, having the same material characteristics as the hollow insulating tubes 102, are disposed between and support the dielectric plate members 96 at their opposite ends. Each of the hollow insulating tube spacers 110 includes a pair of axially aligned slits 112 extending partially along the length of the tube spacers 110 for supporting an edge of the electrodes 98a or 98b. Those skilled in the art will readily appreciate that the hollow insulating tube spacers 110, in combination with the hollow insulating tubes 102, substantially eliminate any flexing or bending of the wire mesh electrodes 98a and 98b which causes an unequal electrical field distribution and potential arcing between the electrodes.

With further reference to FIGS. 1, 3 and 4, the enclosure 42 of the ozone generator cell 40, preferably made of an electrically non-conductive and ozone and acid resistant material, includes a base 114 for receiving the ozone generator cell and a removable top 116. The base 114 includes fasteners 118 for mounting the enclosure 42 to the ground plate 30 of the ozone generating apparatus 10. The top 116 is sealingly engageable with the base 114 through a silicone bead gasket 120 disposed about a peripheral edge of the top and includes fasteners 122 to secure the top in a closed position with the base 114 as shown in FIG. 4.

As described in detail above with reference to FIGS. 1 and 2, the enclosure 42 includes a pair of air intake ports 58, preferably formed in the top 116, for delivering the oxygen containing air 48 to the ozone generator cell 40 within the enclosure. A pair of ozone exhaust ports 60, preferably formed in the top 116, are provided to discharge ozone produced by the ozone generator cell 40. As shown in FIG. 4, a spacer 124, preferably made of epoxy-coated mica, is inserted in the base 114 to support the ozone generator cell 40 with the uppermost dielectric plate member 96 engaging a soft silicone tube 126 mounted on an inner surface of the top 116 midway between the air intake ports 58 and the ozone exhaust ports 60. In this way, oxygen containing air 48 received through air intake ports 58 is directed through the air passages 106 of the ozone generator cell 40, and ozone produced by the ozone generator cell is directed through the ozone exhaust ports 60. Those skilled in the art will recognize that while a pair of air intake ports 58 and a pair of ozone exhaust ports 60 are shown and described with the reference to the top 116, changes may be made to the porting structure of the enclosure 42 without departing from the spirit and scope of the present invention.

In one embodiment (not shown), the spacer 124 includes horizontally disposed top and bottom plates which are separated by four vertically disposed plates mounted edgewise between the top and bottom plates. Each of the vertical plates extends from a midpoint of the top and bottom plates to a respective corner of each top and bottom plate. The spacer 124 further includes a pair of vertically disposed end plates fixed at opposite ends of the spacer. Preferably, the top, bottom, vertical and end plates are joined by the high dielectric strength sealant 108.

Each ozone generator cell 40 may be manufactured with a varying number of electrodes 98a and 98b and dielectric plate members 96 to vary the ozone output of the ozone generating apparatus 10. For example, one application may require an ozone generator cell having four electrodes while another application may require an ozone generator cell having as many as seven electrodes. To this end, spacers 124 of varying height may be used with ozone generator cells of varying height, as determined by the number of electrodes, to fill a portion of the base 114 and maintain the uppermost dielectric plate member 96 of the cell engaged with the soft silicon tube 126 as described above. Moreover, ozone generator cells may be combined with other ozone generator cells to make larger cells. That is, for example, two seven electrode ozone generator cells 40 may be united to form a fourteen electrode ozone generator cell (not shown) to handle larger applications. In a preferred embodiment of the present invention, the enclosure is sized to accommodate an ozone generator cell having 14 electrodes and a spacer 124 is therefore not required.

To this end, an alternative embodiment of the enclosure 42 is shown in FIG. 5 as 42'. The enclosure 42' includes a base 114' having a series of ozone generating cells 40'. In this embodiment, a membrane or divider 128 is disposed between each ozone generator cell 40' to define separate chambers 130 for each of the ozone generator cells. Each chamber 130 has an air input side 130a and an ozone output side 130b. The enclosure 42' includes an air intake port 58', preferably disposed in a removable top 116', for each of the chambers 130. The air intake ports 58' receive the oxygen containing air 48 and deliver the air to the air input side 130a of each ozone generator cell 40' within the chambers 130. An ozone outlet port 60', preferably disposed in the top 116', is provided for each of the chambers 130 to discharge ozone produced by each of the ozone generator cells 40' and exhausted at the ozone output side 130b. In one embodiment as shown in FIG. 5, the enclosure 42' includes conduits 132a extending between each of the air intake ports 58' and the air input side 130a of an associated chamber 130. The enclosure 42' further includes conduits 132b extending between each of the ozone outlet ports 60' and the ozone output side 130b of an associated chamber 130. Preferably, the conduits 132a and 132b include a tapered end 134 within each chamber 130 to improve flow of the oxygen containing air 48 through the ozone generator cells 40'. In an alternative embodiment, the divider 128 is cut at line 131 as shown in FIG. 5 and a common conduit (not shown) may be provided extending between the ozone output sides 130b of chambers 130 and a single ozone outlet port 60'. In another embodiment, the common conduit is dispensed with such that the ozone produced by the ozone generator cells 40' is discharged directly through a single ozone outlet port 60'.

In operation of the ozone generating apparatus 10, as shown most clearly in FIG. 2, the 110 VAC input line 32 is plugged into a standard electrical wall outlet to energize the ozone generating apparatus. Upon actuation of a power switch 136, the 110 VAC input line 32 is coupled to the air pump 44, the timer module 36, and the blower 66 through the variable speed control rheostat 68 as described in more detail below. A power on light 138 is mounted on the housing 12 of the ozone generating apparatus 10 to indicate that the ozone generating apparatus is in a "power on" mode.

In the "power on" mode, the air pump 44 is energized and receives the oxygen containing air, shown diagrammatically by arrows 48 in FIG. 2, through the air intake ports 52 connected to the air filters 50. The air pump 44 communicates the oxygen containing air 48 through the air exhaust ports 54 and conduits 56 to the air intake ports 58 of the enclosure 42 housing the ozone generator cell 40. In the "power on" mode, the timer module 36 is energized to selectively operate or cycle the step-up transformer 34 between "on" and "off" states, e.g., 10 seconds "on" and 10 seconds "off". Preferably, the timer module 36 is selectively settable through fixed or variable resistors to define the duration of the "on" and "off" cycles of the step-up transformer 34. When the step-up transformer 34 is in an "on state", the electrodes 98a and 98b of the ozone generator cell 40 are energized by the electrical leads 38a and 38b, respectively, to produce ozone from the oxygen containing air 48 received through the air intake ports 58. An ozone cell light 140 is mounted on the housing 12 of the ozone generating apparatus 10 to indicate that the ozone generator cell 40 is energized.

The ozone produced by the ozone generator cell 40 is discharged from the enclosure 42 through the ozone exhaust ports 60 and conduits 62. As described in detail above, the conduits 62 are fluidly connected to the ozone distributor 64 mounted within the air discharge channel 70 of the blower 66 for discharging ozone produced by the ozone generator cell 40. The blower 66 drives air in mixed combination with the ozone discharged from the ozone distributor 64 and discharges the mixed air and ozone combination from the ozone outlet 72 in the housing 12 of the ozone generating apparatus 10.

In one embodiment as shown in FIG. 2, a manual timer by-pass switch 142 is provided to by-pass operation of the timer module 36. When the timer by-pass switch 142 is closed, the step-up transformer 34, and thus the ozone generator cell 40, is energized independently of the state of the timer module 36 until the timer by-pass switch is opened. Use of the timer by-pass switch 142 is desirable when continuous operation of the ozone generating apparatus 10 is required.

In an alternative embodiment shown in FIG. 2A, the timer bypass switch 142 of FIG. 2 is replaced with the remote switch circuitry 142' of FIG. 2A. In this embodiment, a remote switch 144 is coupled to the 110 VAC line 32 through a step-down transformer 146. The remote switch 144 is coupled to a low voltage relay 148 which in turn is coupled to a programmable time delay relay 150 for switching the 110 VAC line to the step-up transformer 34. When the remote switch 144 is closed, the timer module 36 is by-passed (overridden) and the programmable time delay relay 150 closes to energize, through step-up transformer 34, the ozone generator cell 40 a predetermined time duration, e.g. 4 hours, independently of the state of the timer module 36. The remote switch circuitry 142' of FIG. 2A is particularly useful in restaurant and bar environments, for example, where continuous ozone production may be required only during peak hours to remove heavy smoke from the air. During off-peak periods, the timer module 36 controls ozone production as described in detail above. While not shown, those skilled in the art will appreciate that a remote ozone cell light may be provided at the remote switch 144 to indicate that the ozone generator cell 40 is energized and operating through the programmable time delay relay 150.

In another embodiment, the remote switch circuitry 142' of FIG. 2A is placed in parallel with the timer by-pass switch 142 of FIG. 2. In this embodiment, the ozone generator cell 40 is energized by the timer module 36 when the timer by-pass switch 142 of FIG. 2 and the remote switch 144 of FIG. 2A are open. If the remote switch 144 is closed and the timer by-pass switch 142 is open, the ozone generator cell 40 is energized by the programmable time delay relay 150 until the relay opens after a preset time period. If the timer by-pass switch 142 is closed, the ozone generator cell 40 is energized, independently of the states of the timer module 36 and programmable time delay relay 150, until the timer by-pass switch 142 is opened. In this way, the ozone generating apparatus 10 is operable in three modes of operation, i.e., cyclic, continuous, and cyclic with remote switch override, to accommodate for different ozone production needs of a user.

As will be appreciated from the detailed description above, the ozone generating apparatus 10 of the present invention is particularly adapted for purifying air within an enclosed room. The design of the ozone generating apparatus 10 makes it readily mountable within the room above a ceiling, as part of a suspended ceiling, or on a wall structure. The fine mesh electrodes 98a and 98b, in combination with the dielectric plate members 96 and hollow insulating tubes 102, provide a compact and lightweight ozone generator cell 40 which is highly efficient in producing ozone from oxygen containing air passed through the cell. The hollow insulating tubes 102 and hollow insulating tube spacers 110 maintain uniform spacing between the wire mesh electrodes 98a and 98b to substantially eliminate arcing between the electrodes, thereby extending the operating life of the ozone generator cell 40. Moreover, the modular construction of the ozone generator cell 40, in combination with the enclosure 42 and spacer 124, provides easy control of ozone production output of the ozone generating apparatus 10 for a particular application.

From the above disclosure of the general principles of the present invention and the preceding detailed description of the preferred embodiments, those skilled in the art will readily comprehend the various modifications to which the present invention is susceptible. Therefore, Applicant desires to be limited only by the scope of the claims and equivalents thereof.

What is claimed is:

1. An ozone generator cell for use in an ozone generating apparatus having a high voltage transformer, an air inlet for receiving oxygen containing air and an ozone outlet for discharging ozone produced by said ozone generator cell, comprising:

a plurality of generally planar and spaced apart dielectric plate members;

a plurality of generally planar electrodes disposed between and in non-contacting relationship with said dielectric plate members, said high voltage transformer being connected to said electrodes to cause an electrical discharge therebetween; and a plurality of hollow insulating tubes disposed between and supporting said dielectric plate members along longitudinal edges thereof, said dielectric plate members and said hollow insulating tubes defining a plurality of air passages therebetween, each of said hollow insulating tubes including an axially aligned slit extending along at least a partial length thereof for supporting a longitudinal edge of said electrodes whereby ozone is produced by said ozone generator cell by passing said oxygen containing air through said air passages and across said electrodes.

2. The ozone generator cell of claim 1 wherein said generally planar electrodes comprise metal mesh.

3. The ozone generator cell of claim 2 wherein said metal mesh is at least as fine as 50×50 mesh.

4. The ozone generator cell of claim 2 wherein said generally planar electrodes have a thickness of about 0.009 in.

5. The ozone generator cell of claim 1 wherein said dielectric plate members comprise mica.

6. The ozone generator cell of claim 5 wherein said dielectric plate members have a thickness of about 0.040 in.

7. The ozone generator cell of claim 1 further including a high dielectric strength sealant disposed between and along the longitudinal edges of said dielectric plate members and adjacently outboard of said hollow insulating tubes.

8. The ozone generator cell of claim 1 wherein said hollow insulating tubes comprise fluorinated polyethylene tubing.

9. The ozone generator cell of claim 1 wherein said hollow insulating tubes have a dielectric strength of at least 2,000 V/mil.

10. The ozone generator cell of claim 1 further including a plurality of hollow insulating tube spacers disposed between and supporting said dielectric plate members at opposite ends thereof, each of said hollow insulating tube spacers including a pair of axially aligned slits extending partially along the length thereof for supporting an edge of said electrodes.

11. The ozone generating cell of claim 10 wherein said hollow insulating tube spacers comprise fluorinated polyethylene tubing.

12. The ozone generating cell of claim 10 wherein said hollow insulating tube spacers have a dielectric strength of at least 2,000 V/mil.

* * * * *